(12) United States Patent
Yun et al.

(10) Patent No.: US 9,382,114 B2
(45) Date of Patent: Jul. 5, 2016

(54) HEAT EXCHANGE TYPE PREREFORMER

(71) Applicant: DOOSAN HEAVY INDUSTRIES & CONSTRUCTION CO., LTD., Changwon-si, Gyeongsangnam-do (KR)

(72) Inventors: Choamun Yun, Daejeon (KR); Jongseung Park, Daejeon (KR); Taehee Kim, Daejeon (KR); Gipung Lee, Daejeon (KR); Taewon Lee, Daejeon (KR)

(73) Assignee: DOOSAN HEAVY INDUSTRIES & CONSTRUCTION CO., LTD., Changwon-Si (KR)

( * ) Notice: Subject to any disclaimer, the term of this patent is extended or adjusted under 35 U.S.C. 154(b) by 124 days.

(21) Appl. No.: 14/369,863

(22) PCT Filed: Dec. 28, 2012

(86) PCT No.: PCT/KR2012/011766
§ 371 (c)(1),
(2) Date: Jun. 30, 2014

(87) PCT Pub. No.: WO2013/100708
PCT Pub. Date: Jul. 4, 2013

(65) Prior Publication Data
US 2014/0369900 A1    Dec. 18, 2014

(30) Foreign Application Priority Data

Dec. 30, 2011  (KR) .................. 10-2011-0147789
Dec. 27, 2012  (KR) .................. 10-2012-0155167

(51) Int. Cl.
*C01B 7/00*      (2006.01)
*C01B 3/32*      (2006.01)
(Continued)

(52) U.S. Cl.
CPC ............... *C01B 3/32* (2013.01); *B01J 19/2425* (2013.01); *C01B 3/384* (2013.01); *H01M 8/0618* (2013.01);
(Continued)

(58) Field of Classification Search
CPC ............. C01B 3/384; C01B 2203/0805; B01J 2208/00221; B01J 8/067; H01M 8/04074
See application file for complete search history.

(56) References Cited

U.S. PATENT DOCUMENTS 6,632,551 B1    10/2003  Kaufmann
2003/0235734 A1*  12/2003  Haltiner, Jr. .............. F28D 7/08
                                                            429/425

(Continued)

FOREIGN PATENT DOCUMENTS

JP    2001-155751 A    6/2001
KR   10-2007-0112418 A   11/2007
(Continued)

OTHER PUBLICATIONS

International Search Report for PCT/KR2012/011766 dated Apr. 22, 2013.

*Primary Examiner* — Imran Akram
(74) *Attorney, Agent, or Firm* — Sughrue Mion, PLLC

(57) ABSTRACT

The present invention provides a heat exchange type prereformer comprising a shell side having a channel to which cathode exhaust gas is supplied and through which cathode exhaust gas flows so that heat can be exchanged between the cathode exhaust gas and the mixture gas supplied for preforming; a catalyst layer arranged so as to overlap one area of the shell side and formed to cause the mixture gas to have a preforming reaction; and a tube side connected to the catalyst layer and arranged so as to overlap the other area of the shell side and formed to cause the preformed mixture gas to exchange heat with the cathode exhaust gas.

6 Claims, 1 Drawing Sheet

(51) Int. Cl.
  C01B 3/38 (2006.01)
  H01M 8/06 (2016.01)
  B01J 19/24 (2006.01)
  H01M 8/04 (2016.01)
  H01M 8/14 (2006.01)

(52) U.S. Cl.
  CPC .. *B01J 2219/2401* (2013.01); *C01B 2203/0227* (2013.01); *C01B 2203/0233* (2013.01); *C01B 2203/0445* (2013.01); *C01B 2203/066* (2013.01); *C01B 2203/0805* (2013.01); *C01B 2203/0833* (2013.01); *H01M 8/04074* (2013.01); *H01M 8/04089* (2013.01); *H01M 2008/147* (2013.01); *Y02E 60/50* (2013.01); *Y02E 60/526* (2013.01)

(56) References Cited

U.S. PATENT DOCUMENTS

| | | | | |
|---|---|---|---|---|
| 2004/0249203 | A1* | 12/2004 | Yada | B01J 8/06 562/545 |
| 2005/0204626 | A1* | 9/2005 | Podhorsky | B01J 19/249 48/127.9 |
| 2005/0287053 | A1* | 12/2005 | Sakai | B01J 8/008 422/607 |
| 2007/0092436 | A1 | 4/2007 | Rojey et al. | |
| 2007/0297959 | A1* | 12/2007 | Suzuta | B01J 8/067 422/312 |
| 2008/0038165 | A1* | 2/2008 | Burlingame | B01J 8/065 422/608 |
| 2008/0081233 | A1* | 4/2008 | Rechberger | F28D 7/0066 429/423 |
| 2008/0093583 | A1 | 4/2008 | Van Den Oosterkamp et al. | |
| 2009/0064579 | A1* | 3/2009 | Wakasugi | B01J 19/0093 48/76 |
| 2009/0123348 | A1* | 5/2009 | Brady | F28D 7/106 422/629 |
| 2009/0173481 | A1* | 7/2009 | Mitsui | B01J 19/0093 165/166 |
| 2010/0269410 | A1* | 10/2010 | Nakamura | C10J 3/00 48/113 |

FOREIGN PATENT DOCUMENTS

| | | |
|---|---|---|
| WO | 02/02220 A1 | 1/2002 |
| WO | 2006/109095 A1 | 10/2006 |

* cited by examiner

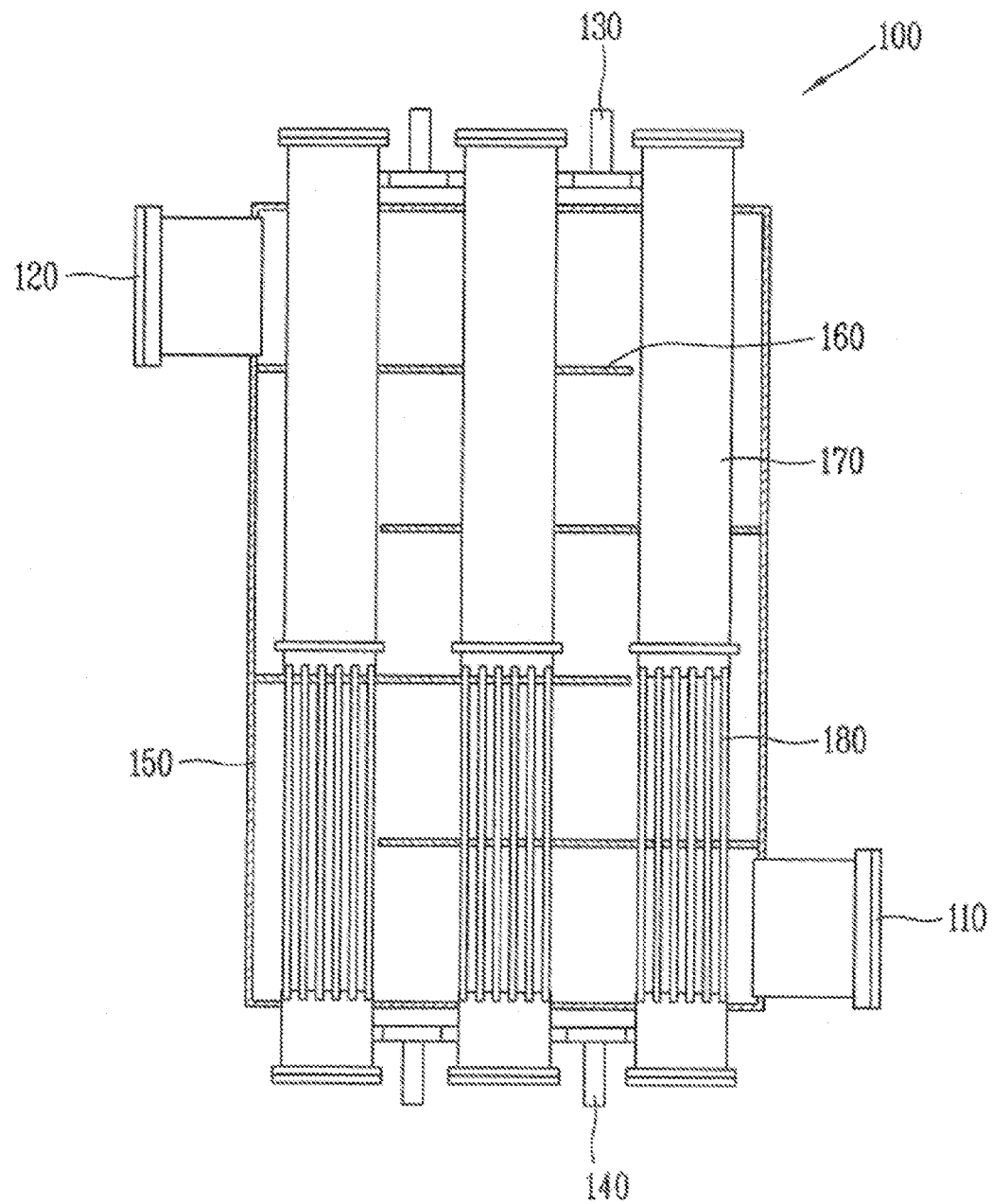

HEAT EXCHANGE TYPE PREREFORMER

CROSS REFERENCE TO RELATED APPLICATIONS

This application is a National Stage of International Application No. PCT/KR2012/011766 filed Dec. 28, 2012, claiming priority based on Korean Patent Application Nos. 10-2011-0147789 filed Dec. 30, 2011 and 10-2012-0155167 filed Dec. 27, 2012, the contents of all of which are incorporated herein by reference in their entirety.

TECHNICAL FIELD

The present invention relates to a prereformer for pre-processing gas supplied to the anode of a fuel cell.

BACKGROUND ART

A fuel cell is a cell for directly converting chemical energy, generated by the oxidation of fuel, into electrical energy.

Most of fuel cells use hydrogen as fuel. However, the use of a fuel cell using hydrogen in the state in which the supply system of hydrogen fuel has not been constructed as it is now is limited.

Accordingly, there is a need for a transitional system that generates hydrogen by prereforming carbonate hydrogen-based fuel and uses the hydrogen as fuel. For this reason, a fuel cell system that is now being developed is equipped with such a prereformer.

The methanation of carbonate hydrogen series that belong to carbonate hydrogen series and that have a carbon number of 2 (C2) or higher other than $CH_4$, hydrogen conversion, etc. are performed through the prereformer. Accordingly, a reduction in the performance of a fuel cell stack attributable to coking generated when C2 or higher is introduced into the fuel cell stack can be prevented. Furthermore, produced hydrogen gas maintains a reduction atmosphere within the fuel cell stack, and functions as a controller in thermal management. Furthermore, if some oxidants are introduced, the produced hydrogen gas functions as an oxidizer, and is responsible for a buffer that collects sulfur when the sulfur is introduced and protects the fuel cell stack.

A steam reforming reaction, that is, a main reaction of the prereformer, is a heat absorption reaction, and there is a case where the temperature conditions of gas supplied to the anode are not satisfied. To this end, there is a need for a structure for satisfying the temperature conditions.

DISCLOSURE

Technical Problem

The present invention proposes a prereformer of a new structure which is capable of prereforming gas supplied to an anode and also satisfying temperature conditions.

Technical Solution

To achieve the above objects of the present invention, a heat exchange type prereformer in accordance with an embodiment of the present invention includes a shell side equipped with a channel through which an exhaust gas is supplied and flows so that an exhaust gas of an anode is subject to a heat exchange with a mixture gas supplied for prereforming, a catalyst layer disposed to overlap with one region of the shell side and configured so that the mixture gas generates a prereforming reaction, and a tube side connected to the catalyst layer, disposed to overlap with the other region of the shell side, and formed so that the prereformed mixture gas is subject to a heat exchange with the exhaust gas. The mixture gas may include a fuel gas and steam.

In accordance with an embodiment related to the present invention, the internal space of the shell side is partitioned, the channel is formed in the partitioned internal spaces, and baffles configured to control a flow of the exhaust gas are installed in the partitioned internal spaces. The catalyst layer and the tube side may be extended and formed in one direction, and the baffles may be disposed vertically to the one direction.

In accordance with another embodiment of the present invention, the tube side is disposed adjacent to one end of the shell side into which the exhaust gas is introduced, and the catalyst layer is disposed adjacent to the other end of the shell side from which the exhaust gas is drained.

In accordance with another embodiment of the present invention, the tube side is not filled with a catalyst.

In accordance with another embodiment of the present invention, the catalyst layer and the tube side form a set, a plurality of the sets is formed and spaced from each other, one ends of the plurality of the sets are connected to a fuel gas inlet into which a fuel gas is introduced, and other ends of the plurality of the sets are connected to a fuel gas outlet from which the fuel gas is drained.

In the above structure, the catalyst layer may include a plurality of pipes connected to the fuel gas inlet so that the mixture gas is distributed and introduced.

Furthermore, the tube side may include a tube bundle connected to the plurality of pipes in a bundle form so that a heat exchange area is increased.

In accordance with another embodiment of the present invention, the mixture gas drained from the tube side is supplied to an anode.

In accordance with another embodiment of the present invention, the catalyst layer includes at least one of CRG F, CRG LH, C11PR, AR-301, RKNGR, an oxidizer catalyst, a propane reforming catalyst, and a multi-fuel processing catalyst.

Advantageous Effects

In accordance with the present invention having the above configuration, a mixture gas generates a prereforming reaction in the catalyst layer, and satisfies the temperature conditions of gas supplied to the anode through a heat exchange with the exhaust gas discharged by the cathode in the tube side. In this case, an occupied space can be minimized compared to the case where the temperature conditions are satisfied using a separate apparatus, and efficiency can be improved because the exhaust gas discharged by the cathode is used.

The above structure can have improved reactivity because the cold spot of the catalyst layer is reduced and can satisfy the same performance conditions using a small amount of catalyst compared to an existing catalyst because the structure corresponds to a heat exchange method. Furthermore, the above structure is advantageous in terms of a cost reduction because a commercial pipe may be used in the catalyst layer instead of a reactor vessel.

The heat of the prereformer can be controlled and the lifespan of the catalyst layer can be extended because the tube bundle is connected to the catalyst layer and configured to control the flow rate of a mixture gas. Power can be stably produced because gas having a specific concentration is supplied to the fuel cell stack.

DESCRIPTION OF DRAWINGS

FIG. 1 is a conceptual diagram illustrating a prereformer according to an embodiment of the present invention.

MODE FOR INVENTION

Hereinafter, a heat exchange type prereformer related to the present invention is described in detail with reference to the drawings. An expression of the singular number used in this specification includes an expression of the plural number unless clearly defined otherwise in the context.

The heat exchange type prereformer of the present invention is configured to generate hydrogen fuel supplied to a fuel cell. The fuel cell may be a Molten Carbonate Fuel Cell (MCFC), for example.

FIG. 1 is a conceptual diagram illustrating a prereformer according to an embodiment of the present invention.

Referring to FIG. 1, the prereformer 100 is configured to prereform gas supplied to an anode and also to satisfy the temperature conditions of gas to be supplied to the anode.

More specifically, an exhaust gas of a high temperature that is discharged by a cathode is introduced into a shell side 150 through an exhaust gas inlet 110. The shell side 150 is equipped with a channel. The exhaust gas is subject to a heat exchange with a mixture gas, supplied for prereforming, while flowing along the channel. After the heat exchange, the exhaust gas is externally discharged through an exhaust gas outlet 120.

The mixture gas is introduced into a catalyst layer 170 through a mixture gas inlet 130. The mixture gas may be formed of gas in which a carbonate hydrogen-based fuel gas (e.g., NG, NPG, or bio gas) and steam are mixed at a specific ratio.

The catalyst layer 170 is disposed to overlap with one region of the shell side 150, and is configured to perform a heat exchange with the exhaust gas. The mixture gas injected into the catalyst layer 170 generates reactions, including side reactions, in addition to main reactions, such as a water gas shift reaction, a steam reforming reaction, and a methanation reaction so that the component conditions of gas to be supplied to the anode are satisfied.

The catalyst layer 170 includes at least one of the catalyst layers 170 in which CRG F, CRG LH, C11PR, AR-301, RKNGR, or an oxidizer catalyst, a propane reforming catalyst, and a multi-fuel processing catalyst are mixed, if necessary. A commercial pipe may be used as the catalyst layer 170.

A tube side 180 is connected to the catalyst layer 170, and is disposed to overlap with the other region of the shell side 150. The tube side 180 has a tube shape in which a catalyst is not filled. The mixture gas that is introduced into the tube side 180 through the catalyst layer 170 and that is prereformed is subject to a heat exchange with the exhaust gas that flows through the channel of the shell side 150, and is formed to satisfy the temperature conditions of gas to be supplied to the anode.

The mixture gas that is drained from the tube side 180 and that satisfies component conditions and temperature conditions is discharged through a mixture gas outlet 140, and is supplied to the anode.

The flow of the exhaust gas is described below. The exhaust gas of a high temperature that is discharged by the cathode is supplied to the exhaust gas inlet 110. The supplied exhaust gas is subject to a primary heat exchange with the mixture gas not having a catalyst that flows through the tube side 180 and that has been prereformed so that temperature conditions for which the mixture gas is supplied to the anode are satisfied. Thereafter, the exhaust gas generates reactions through a secondary heat exchange while passing through the catalyst layer 170, and is discharged by the prereformer 100 through the exhaust gas outlet 120.

Baffles 160 for forming a channel through which the exhaust gas flows by partitioning the internal space of the shell side 150 are installed in the shell side 150. The baffles 160 are configured to guide the flow of the exhaust gas. For example, the baffles 160 may be disposed to be crisscross on both sides of the inside of the shell side and to guide the flow of the exhaust gas so that the exhaust gas may flow in a meandering way.

The pipe of the catalyst layer 170 and the tube side 180 are extended and formed in one direction, and the baffles 160 may be disposed vertically to the one direction. Furthermore, the tube side 180 is disposed adjacent to one end [the exhaust gas inlet (110) side] of the shell side 150 into which the exhaust gas is introduced. The catalyst layer 170 may be disposed adjacent to the other end [the exhaust gas outlet (120) side] of the shell side 150 from which the exhaust gas is drained.

In accordance with the above configuration, the exhaust gas of a high temperature that is introduced through the exhaust gas inlet 110 is sequentially subject to a heat exchange with the tube side 180 and the catalyst layer 170 according to the flow of the channel, and a stable operation is enabled because the heat exchange is generally performed without being biased to any one point.

The catalyst layer 170 and the tube side 180 form one set. A plurality of the sets is formed and spaced apart from each other. One end of the set is connected to a fuel gas inlet into which a fuel gas is introduced, and the other end thereof is connected to a fuel gas outlet from which the fuel gas is discharged.

In this case, in distributing the mixture gas, a flow tipping effect, that is, channeling, may occur because differential pressure is reduced due to a reduction of temperature attributable to heat absorption. A catalyst is degraded in a part where the channeling is generated, thereby reducing the lifespan of the catalyst and thus increasing maintenance cost.

In order to structurally prevent the channeling, the catalyst layer 170 may be configured to include a plurality of pipes so that it controls the flow rate of the mixture gas. In accordance with the above configuration, a phenomenon in which the quantity of flow is concentrated on any one side can be prevented because the mixture gas is properly distributed to the pipes. As a result, the lifespan of the catalyst layer 170 can be extended, and power can be stably produced because gas having a specific concentration is supplied to a fuel cell stack.

Furthermore, the tube side 180 may be formed of a tube bundle so that heat exchange efficiency is improved through an increase of a heat exchange area. That is, the prereformer 100 can be configured more compactly, and efficiency thereof can be improved through the structure in which the catalyst layer 170 including the plurality of pipes in order to prevent the flow tipping effect and the tube bundle for improving heat exchange efficiency are coupled. This drawing illustrates that the tube bundle for a heat exchange is connected to each of the pipes that form the catalyst layers 170.

In accordance with the present invention having the above configuration, the mixture gas generates a preforming reaction in the catalyst layer 170, and satisfies the temperature conditions of gas, supplied to the anode, through a heat exchange with the exhaust gas discharged by the cathode in the tube side 180. In this case, an occupied space can be minimized compared to the case where the temperature conditions are satisfied using a separate apparatus, and efficiency can be improved because the exhaust gas discharged by the cathode is used.

The above structure can reduce the cold spot of the catalyst layer 170 and improve reactivity because it is a heat exchange method, and can satisfy the same performance conditions using a small amount of a catalyst compared to an existing catalyst. Furthermore, the above structure has an advantage in terms of a cost reduction because a commercial pipe can be used in the catalyst layer 170 instead of a reactor vessel.

The aforementioned heat exchange type prereformer is not limited and applied to the configurations and methods of the aforemtioned embodiments, and all or some of the embodiments may be selectively combined and configured so that the embodiments may be modified in various ways.

INDUSTRIAL APPLICABILITY

The embodiments of the present invention propose the prereformer having a new structure which is capable of pre-reforming gas supplied to the anode and also satisfying temperature conditions, and thus can be applied to various industry fields related to the prereformer.

The invention claimed is:

1. A heat exchange type prereformer, comprising:
a shell side configured to flow an exhaust gas therein;
an exhaust gas inlet configured to introduce the exhaust gas that has been discharged by a cathode into the shell side;
a catalyst layer including a plurality of pipes disposed within one region of the shell side,
a mixture gas inlet in communication with the catalyst layer and configured to introduce a mixture gas into the catalyst layer, wherein the mixture gas inlet is disposed in the one region of the shell side; and
a tube side connected to the catalyst layer and disposed within an other region of the shell side, the tube side including a plurality of tube bundles each connected to a pipe of the catalyst layer so that a heat exchange area is increased;
wherein the exhaust gas inlet is disposed in the other region of the shell side;
wherein the catalyst layer is configured to perform a pre-reforming reaction to the mixture gas to obtain a prereformed mixture gas;
wherein the tube side configured to receive the prereformed mixture gas from the catalyst layer and subject the prereformed mixture gas to the heat exchange area with the exhaust gas flowing through the tube side;
wherein baffles are disposed in the shell side and configured to form a channel by partitioning an internal space of the shell side and to control a flow of the exhaust gas flowing within the shell side.

2. The heat exchange type prereformer of claim 1, wherein the plurality of pipes of the catalyst layer and the tube bundles of the tube side are extended in a same direction.

3. The heat exchange type prereformer of claim 2, wherein the baffles installed within the shell side are disposed in a direction perpendicular to a direction in which the catalyst layer and the tube side are extended.

4. The heat exchange type prereformer of claim 1, wherein the tube side is not filled with a catalyst.

5. The heat exchange type performer of claim 1, further comprising a preformed mixture gas outlet connected to an anode.

6. The heat exchange type prereformer of claim 1, wherein the catalyst layer comprises at least one of CRG F, CRG LH, C11PR, AR-301, RKNGR, an oxidizer catalyst, a propane reforming catalyst, and a multi-fuel processing catalyst.

* * * * *